D. H. CLOSE.
Station-Indicators.
No. 147,308. Patented Feb. 10, 1874.
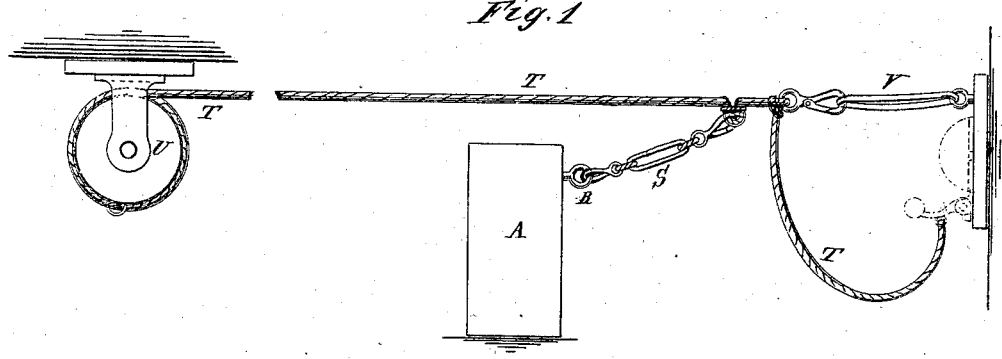
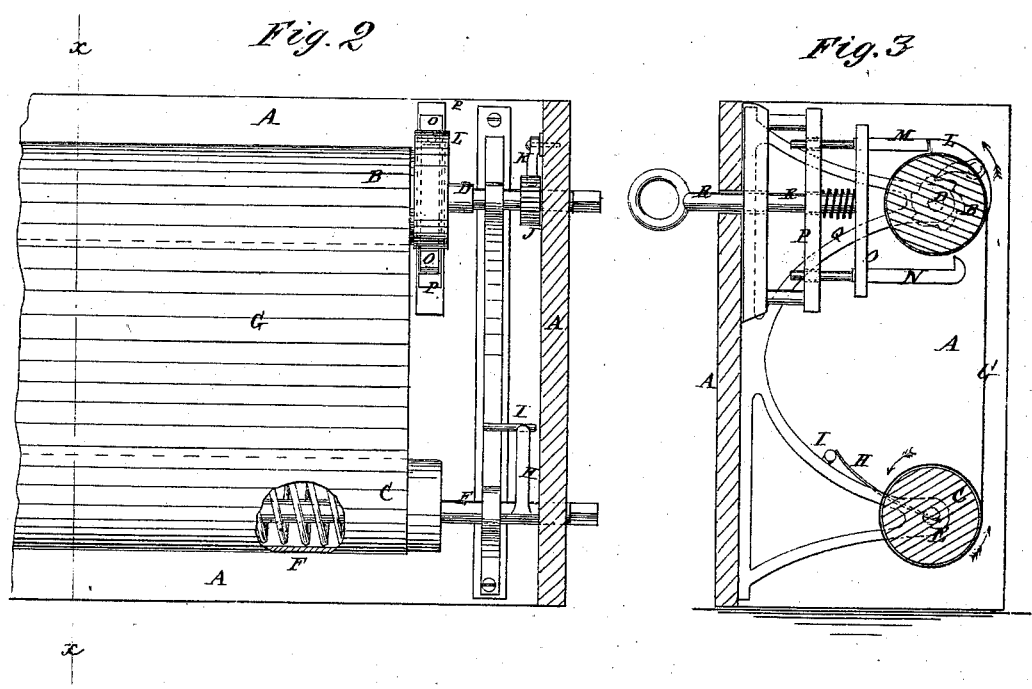
Witnesses:
A. W. Almqvist
Alex F. Roberts
Inventor:
D. H. Close
Per Munn & Co
Attorneys.

UNITED STATES PATENT OFFICE.

DANIEL H. CLOSE, OF NEW YORK, N. Y.

IMPROVEMENT IN STATION-INDICATORS.

Specification forming part of Letters Patent No. 147,308, dated February 10, 1874; application filed September 13, 1873.

*To all whom it may concern:*

Be it known that I, DANIEL H. CLOSE, of the city, county, and State of New York, have invented a new and useful Improvement in Station-Indicator, of which the following is a specification:

Figure 1 is a view illustrating the arrangement of my improved device. Fig. 2 is a detail front view of a part of the indicator. Fig. 3 is a detail section of the same taken through the line *x x* of Fig. 2.

Similar letters of reference indicate corresponding parts.

My invention will first be fully described, and then pointed out in the claims.

A is a box, which is designed to be made with its front wholly or partially of glass, and one of which is secured in some suitable place in each end of each car. B C are two rollers, which are designed to be placed upon shafts D E in the upper and lower parts of the box A, and which are connected with their shafts by coiled springs. The spring upon the lower roller is designed to be only of sufficient strength to hold the strip G of canvas or other suitable material taut. The spring of the roller B should be of sufficient strength to turn both the rollers B C and wind the strip G from the roller C upon the roller B. The spring of the upper roller is wound up by turning the shaft D with a key. The spring F of the lower roller C is wound up by the operation of winding the strip G from it upon the roller B. To the shaft E is attached a spring-arm, H, which strikes against a stop, I, attached to the bracket, that supports the said shaft, or to the box A. The spring H should be of such a strength as to resist the strength of the spring F when it has only sufficient tension to keep the strip G taut, and which, when the tension of the spring F increases, will yield and pass the stop I, so that the tension of the spring F can never become too great. The roller C is turned to wind the strip G from the roller B upon the roller C by turning the shaft E with a key. The stop I should be provided with a set-screw or other device, to enable it to be moved back, so as to be out of the way when turning the shaft E to wind the strip G upon the roller C. The shaft D is provided with a ratchet-wheel, J, and pawl, K, to keep it from turning back, and thus unwinding the spring. Upon the roller B is formed a single cam or projection, L, with a square shoulder upon its forward side to receive the holding-pawls, and with its rear side inclined so as to readily pass said pawl when the roller B is turned back to wind the strip G upon the roller C. M N are two pawls placed upon the opposite sides of the roller B, and which are attached to the opposite ends of a bar, O. The rear ends of the pawls M N project in the rear of the bar O, so as to pass through holes in the bar P, and serve as guides to keep the pawls M N in line as they move back and forward. The pawls M N and bar O are held forward by one or more springs, Q, interposed between the bars O and P. The bar P is supported at such a distance from the box A that the rear ends of the pawls M N may have sufficient room to move back. R is a rod attached to the bar O, and which passes out through the bar P and through the rear side of the box A, and has an eye formed upon its rear or outer end to receive the end of the cord S, the other end of which is connected with the bell-cord T. By this construction, when the rod R is drawn back the cam L is released from the pawl M, and it is caught by the pawl N when the spring has revolved the roller B one-half a revolution. As the rod R is released the pawls M N move forward and the roller B completes its revolution, bringing the name of the next station into view. The other end of the cord S is attached to the bell-cord T or some other cord passing from the engine through all the cars of the train. The rear end of the cord T is attached to a spring-roller, U, attached to the rear end of the rear car, and which is designed to take up the slack of the bell-cord T as the cars are stopped or backed. One of the spring-rollers U is designed to be attached to each end of each car, so that one of them may always be at the rear end of the rear car, however the train may be made up; or brackets may be attached to the cars and a single roller used instead of having one for each car. It should be observed that the indicator at the forward end of each car should be connected with the bell-cord T. To the bell-cord T, near its forward end, is attached a rubber or other spring, V, which is also attached to the engine, near the bell, and which should be of a little greater strength than the spring of the roller U, so that the tension of the spring of said roller and the swaying of the cars cannot ring the bell. The end of the bell-cord T between the spring V and the bell should be slack, as shown in Fig. 1, so that the bell can only be rung by pulling the bell-cord with sufficient force to overcome the tension of the spring V. With this construction, when the train is at, about to leave, or has left, a station, the engineer or some one at the forward end of the train, pulls the bell-cord T toward the engine. This draws the cords S and draws back the pawls M N, allowing the roller B to make a half-revolution. In case some of the cars may be closer together than others, the spring in the cords S allows said cords to give until all the pawls have been drawn back; then, as the bell-cord T is released, the rollers B complete their revolution and the name of the next station is displayed. It should be observed that the pawls M N are so arranged that the cam L is never released from one pawl until the other pawl is in proper position to receive it, so that the roller B can never make more than its half-revolution at any one time.

Having thus described my invention, I claim as new and desire to secure by Letters Patent—

1. The cam L, pawls M N, cross-bars O P, spring Q, and rod R, in combination with the spring-roller B that carries the strip G, substantially as herein shown and described.

2. The spring-roller U, cord T, spring V, and cord S, in combination with the sliding rod R, cross-bars O P, pawls M N, cam L, and roller B, substantially as and for the purpose specified.

3. The combination of the spring H and stop I with the shaft E of the spring-roller C, substantially as herein shown and described.

DANIEL H. CLOSE.

Witnesses:
JAMES T. GRAHAM,
T. B. MOSHER.